US009785622B2

(12) United States Patent
Bhanoo (10) Patent No.: US 9,785,622 B2
(45) Date of Patent: *Oct. 10, 2017

(54) METHODS AND SYSTEMS TO COPY WEB CONTENT SELECTIONS

(71) Applicant: GOOGLE INC., Mountain View, CA (US)

(72) Inventor: Hemant Madhav Bhanoo, Palo Alto, CA (US)

(73) Assignee: GOOGLE INC., Mountain View, CA (US)

(*) Notice: Subject to any disclaimer, the term of this patent is extended or adjusted under 35 U.S.C. 154(b) by 698 days.

This patent is subject to a terminal disclaimer.

(21) Appl. No.: 14/107,591

(22) Filed: Dec. 16, 2013

(65) Prior Publication Data

US 2014/0108916 A1    Apr. 17, 2014

Related U.S. Application Data

(63) Continuation of application No. 13/188,040, filed on Jul. 21, 2011, now Pat. No. 8,635,518.

(51) Int. Cl.
*G06F 17/00* (2006.01)
*G06F 17/22* (2006.01)
*G06F 17/24* (2006.01)
*G06F 17/21* (2006.01)

(52) U.S. Cl.
CPC .......... *G06F 17/2247* (2013.01); *G06F 17/24* (2013.01); *G06F 17/218* (2013.01)

(58) Field of Classification Search
CPC ................ G06F 17/2247; G06F 17/24; G06F 17/30014; G06F 17/218

USPC ................................ 715/205, 234, 255, 236
See application file for complete search history.

(56) References Cited

U.S. PATENT DOCUMENTS

| 6,128,655 | A  | * | 10/2000 | Fields ............... G06F 17/30867 |
| | | | | 707/E17.109 |
| 6,741,242 | B1 | | 5/2004 | Itoh et al. |
| 7,111,234 | B2 | * | 9/2006 | Peck ....................... G06F 17/24 |
| | | | | 715/255 |
| 7,246,305 | B2 | * | 7/2007 | Batres ..................... G06Q 30/04 |
| | | | | 715/234 |
| 7,469,388 | B1 | | 12/2008 | Baudisch et al. |

(Continued)

OTHER PUBLICATIONS

Krupl-Sypien et al., A Versatile Model for Web Page Representation, Information Extraction and Content Re-Packaging, ACM 2011, pp. 129-138.*

(Continued)

*Primary Examiner* — Cong-Lac Huynh
(74) *Attorney, Agent, or Firm* — McDermott Will & Emery LLP (57) ABSTRACT

Embodiments disclosed herein relate to copying web content selections. An embodiment includes detecting an intent to copy a selected region of a web content area displayed in a web browser, drawing an image representing the selected region into an image canvas, storing the image in the DOM of the displayed web content area as referenced by a browser image element while the web content area is displayed in the web browser, and changing a browser selection range to point to the DOM storing the image representing the selected region, wherein the image is embedded into at least one content area distinct from the web content area.

15 Claims, 6 Drawing Sheets

(56) References Cited

U.S. PATENT DOCUMENTS

| | | | |
|---|---|---|---|
| 7,904,570 B1* | 3/2011 | Kroupa | G06F 17/30067 709/201 |
| 8,028,226 B2 | 9/2011 | Boguraev et al. | |
| 8,078,986 B1 | 12/2011 | Rhyne et al. | |
| 8,086,957 B2 | 12/2011 | Bauchot et al. | |
| 8,140,646 B2 | 3/2012 | Mickens et al. | |
| 8,225,197 B1* | 7/2012 | Szewczyk | G06F 9/4443 715/241 |
| 8,275,859 B2 | 9/2012 | Burckart et al. | |
| 8,332,763 B2* | 12/2012 | Zhang | G06F 17/30893 715/255 |
| 8,363,232 B2 | 1/2013 | Sedky et al. | |
| 8,413,061 B2* | 4/2013 | Sawant | G06F 17/30896 715/239 |
| 8,593,666 B2* | 11/2013 | Xiao | G06F 17/30905 358/1.15 |
| 8,635,518 B1 | 1/2014 | Bhanoo | |
| 8,913,067 B1* | 12/2014 | Kokkevis | G06F 9/4443 345/522 |
| 8,943,401 B2* | 1/2015 | Martinez | G06F 17/3089 705/14.49 |
| 9,460,062 B2* | 10/2016 | Antipa | G06F 17/2247 |
| 9,565,265 B2* | 2/2017 | Joel | G06F 17/30905 |
| 2002/0069218 A1* | 6/2002 | Sull | G06F 17/30796 715/202 |
| 2002/0188636 A1* | 12/2002 | Peck | G06F 17/24 715/255 |
| 2005/0268230 A1* | 12/2005 | Bales | G06F 17/212 715/255 |
| 2007/0124446 A1* | 5/2007 | Coulthard | G06F 9/505 709/223 |
| 2007/0256003 A1 | 11/2007 | Wagoner et al. | |
| 2008/0155397 A1* | 6/2008 | Bissonnette | G06F 17/212 715/256 |
| 2008/0183573 A1 | 7/2008 | Muschetto | |
| 2008/0184102 A1* | 7/2008 | Selig | G06F 17/243 715/234 |
| 2009/0007273 A1* | 1/2009 | Kim | G06F 17/3089 726/26 |
| 2009/0161132 A1* | 6/2009 | Sato | H04N 1/00222 358/1.9 |
| 2009/0217153 A1 | 8/2009 | Oshima et al. | |
| 2009/0225037 A1 | 9/2009 | Williamson et al. | |
| 2009/0319888 A1* | 12/2009 | Oygard | G06F 17/211 715/252 |
| 2010/0042933 A1 | 2/2010 | Ragusa | |
| 2010/0122160 A1 | 5/2010 | Chirakansakcharoen | G06F 17/24 715/256 |
| 2010/0211865 A1 | 8/2010 | Fanning et al. | |
| 2010/0286977 A1* | 11/2010 | Chin | G06F 17/289 704/4 |
| 2011/0016359 A1 | 1/2011 | Kawanaka et al. | |
| 2011/0040753 A1 | 2/2011 | Knight | |
| 2011/0107200 A1* | 5/2011 | Rogers | G06F 17/218 715/235 |
| 2011/0320964 A1* | 12/2011 | Gambhir | G06F 3/0481 715/756 |
| 2012/0010995 A1* | 1/2012 | Skirpa | G06F 3/0481 705/14.49 |
| 2012/0017142 A1 | 1/2012 | Nagao | |
| 2012/0017284 A1* | 1/2012 | Kim | G06F 17/3089 726/26 |
| 2012/0099153 A1 | 4/2012 | Aoki | |
| 2012/0117486 A1* | 5/2012 | Myman | G06F 17/30899 715/745 |
| 2012/0151372 A1 | 6/2012 | Kominac et al. | |
| 2012/0185764 A1 | 7/2012 | Ball et al. | |
| 2012/0203854 A1 | 8/2012 | Chan et al. | |
| 2012/0221929 A1 | 8/2012 | Bolsinga et al. | |
| 2012/0226972 A1* | 9/2012 | Fainberg | G06F 17/30902 715/234 |
| 2012/0246554 A1 | 9/2012 | Shappir | |
| 2012/0260157 A1 | 10/2012 | Zhu et al. | |
| 2012/0260162 A1 | 10/2012 | Abel et al. | |
| 2012/0266061 A1 | 10/2012 | Williamson et al. | |
| 2012/0271831 A1 | 10/2012 | Narayanan et al. | |
| 2012/0303481 A1 | 11/2012 | LouisN'jai | |
| 2013/0050253 A1* | 2/2013 | Jooste | G06F 17/30899 345/629 |
| 2013/0097486 A1* | 4/2013 | Miller | H04L 12/2697 715/237 |
| 2013/0124976 A1* | 5/2013 | Zahavi | H04L 67/20 715/234 |
| 2013/0132190 A1 | 5/2013 | Lagle Ruiz et al. | |
| 2014/0108916 A1 | 4/2014 | Bhanoo | |
| 2014/0250243 A1* | 9/2014 | Keebler | G06F 17/30578 709/248 |
| 2014/0344663 A1* | 11/2014 | Joel | G06F 17/2264 715/234 |
| 2014/0344705 A1* | 11/2014 | Dimitrov | G06F 3/0481 715/744 |
| 2015/0193108 A1* | 7/2015 | Li | G06F 3/0486 715/748 |
| 2015/0212982 A1* | 7/2015 | Berger | G06F 17/30274 715/255 |

OTHER PUBLICATIONS

Kherfi et al., Image Retrieval from the World Wide Web: Issues, Techniques, and Systems, ACM 2004, pp. 35-67.*

Josephson et al., Visual Attention to Repeated Internet Images: Testing the Scanpath Theory on the World Wide Web, ACM 2002, pp. 43-49.*

Hartmann et al., Programming by a Sample: Rapidly Creating Web Applications with d.mix, ACM 2007,pp. 241-250.*

Dekhtyar et al., Support for XML Markup of Image-based Electronic Editions, Google 2006, pp. 55-69.

Hinckley et al., Informal Information Gathering Techniques for Active Reading, ACM 2012, pp. 1893-1896.

Kerne et al., Meta-Metadata: A Metadata Semantics Language for Collection Representation Applications, ACM 2010, pp. 1129-1138.

Saund et al., Perceptually-Supported Image Editing of Text and Graphics, ACM 2003, pp. 183-192.

* cited by examiner

METHODS AND SYSTEMS TO COPY WEB CONTENT SELECTIONS

CROSS-REFERENCE TO RELATED APPLICATIONS

This application is a continuation of U.S. patent application Ser. No. 13/188,040, titled "Methods and Systems to Copy Web Content Selections", filed Jul. 21, 2011, issued as U.S. Pat. No. 8,635,518, which is incorporated herein by reference in its entirety.

BACKGROUND

Field of the Invention

Embodiments generally relate to interacting with web content, and particularly to copying web content selections.

Background Information

Web applications are applications that can be hosted within a web browser or those that can be accessed, for example, over a network such as the Internet or an intranet. Web applications are increasing in popularity due to the ubiquity of web browsers and the convenience of using a web browser as a client.

Web applications and other interactive web content are often constructed and rendered in a browser using Hyper Text Markup Language (HTML) and associated scripts. Using mark-up languages such as HTML 5, it is possible to build rich in-browser applications (e.g., image editors). Web applications, such as image editors, enable users to view and edit content (e.g., photographs) within their web browser. Other web applications enable users to read books displayed as scanned images. However, users are unable to copy content selections (e.g., cropped image regions or interactive content) rendered within these web applications to a system clipboard.

SUMMARY

A method of copying web content selections includes detecting an intent to copy a selected region in a web content area, drawing an image representing the selected region into an image canvas, the image canvas based on dimensions of the selected region, storing the image in a data structure referenced by a browser image element, and changing a browser selection range to point to the data structure storing the image representing the selected region, wherein the image can be embedded into at least one content area distinct from the web content area.

A system for copying web content selections includes a first module configured to detect an intent to copy a selected region in a web content area, a second module configured to draw an image representing the selected region into an image canvas, the image canvas based on dimensions of the selected region, a third module configured to store the image in a data structure referenced by a browser image element, and a fourth module configured to change a browser selection range to point to the data structure storing the image representing the selected region, wherein the image can be embedded into at least one content area distinct from the web content area.

Further embodiments, features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments described herein relate to copying web content selections. These embodiments enable users to copy one or more selected regions in a web content area and embed (or paste) the copied selected regions into at least one content area distinct from the web content area. Such web content areas include, but are not limited to, content areas rendered as images using HTML5 and interactive script-based based content areas.

In an embodiment, an intent to copy a selected region in a web content area is detected. As an example, the intent to copy (e.g., a "beforecopy" event) may be detected (or intercepted) when a user selects region(s) in a web content area and provides a copy command. When the intent is detected, embodiments draw an image representing the selected region into an image canvas. The image canvas can be based on dimensions of the selected region. The drawn image can be stored in a data structure (e.g., a document object model (DOM) container of the web content area) referenced by a browser image element. Embodiments also extract metadata (e.g., content citation) associated with the selected region and append the metadata to the image.

In order to copy the image representing the selected region to a system clipboard, any previously stored contents of a browser selection range are cleared and the browser selection range is changed to point to the data structure storing the image representing the selected region, before the browser copies the contents of the browser selection range into a system clipboard to perform a copy operation responsive to the user's intent to copy the selected region. In this way, the image (or metadata appended image) is copied to the system clipboard when the browser performs a copy operation because the browser copies contents of the changed browser selection range to the system clipboard. Once the image is stored in the system clipboard, the image can be embedded (or pasted) into other content areas distinct from the web content area. In this way, users are able to conveniently copy and paste web content selections.

Figure 1:
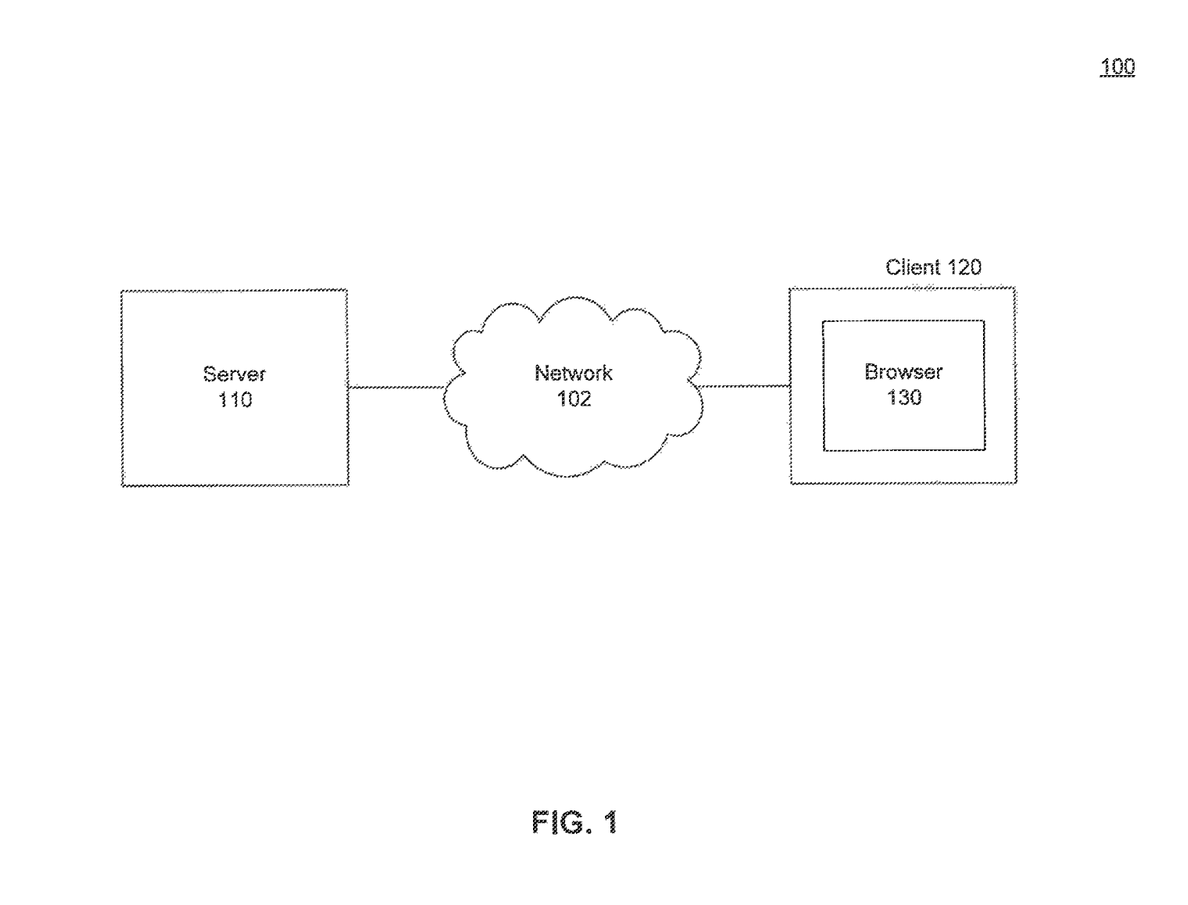
FIG. 1 is a diagram of an exemplary environment in which embodiments may be implemented.

The following describes a system for copying web content selections according to embodiments illustrated in FIGS. 1-6. FIG. 1 is a diagram of an exemplary environment 100 in which embodiments may be implemented. While the following is described in terms of FIG. 1, the embodiments are not limited to the environment illustrated in FIG. 1. For example, any system having generally the structure of FIG. 1, or that would benefit from the operation, methods and functions as described herein may be used.

In an exemplary embodiment, system 100 shows client 120 comprising browser 130, which is used to connect to server 110 over one or more networks 102.

According to an embodiment, browser 130 may include any device, application or module that enables a user or computer to navigate aid/or retrieve data from another data source, typically over a network. Browser 130 may include any conventional web browser such as those that are widely available. According to a further embodiment, browser 130 may also be configured to use any number of protocols, known now or developed in the future, including protocols such as HTTP, FTP, and underlying protocols such as TCP/IP or UDP. In an embodiment, browser 130 is configured to run (or execute) web applications. As noted above, web applications are applications that can be hosted within a web browser or those that can be accessed, for example, over a network such as the Internet or an intranet.

Browser 130 can further communicate with an input (not shown) to allow a user to input data, to input commands, or to provide other control information to browser 130. Browser 130 may request content from server 110, based on user input. Server lit) may respond to the request by providing content back to browser 130 and client 120 via network 102. Browser 130 may also be configured to retrieve content from server 110 without user intervention.

In an embodiment, network(s) 102 can be any type of data network or combination of data networks including, but not limited to, a local area network (LAN), a medium area network, or a wide area network such as the Internet. Network 102, for example, can be a wired or wireless network that allows client 120 and server 110 to communicate with each other. Network 102 can further support world-wide-web (e.g. Internet) protocols and services.

Server 110 provides content (e.g., web pages, applications (or "apps"), audio, video, etc.) that can be retrieved by client 120 over network 102. Content retrieved by client 120 can be disseminated via browser 130. In an embodiment, server 110 and/or browser 130 includes content copier 210, which is described further below.

In an embodiment, client 120 and server 110 can each be implemented on a computing device. Such a computing device includes, but is not limited to, a personal computer, mobile device such as a mobile phone, workstation, embedded system, game console, television, set-top box, or any other computing device that can support web browsing. Such a computing device may include, but is not limited to, a device having a processor and memory for executing and storing instructions. Such a computing device may include software, firmware, and hardware. The computing device may also have multiple processors and multiple shared or separate memory components. Software may include one or more applications and an operating system. Hardware can include, but is not limited to, a processor, memory and graphical user interface display. An optional input device, such as a mouse or touch screen, may be used.

Figure 2:
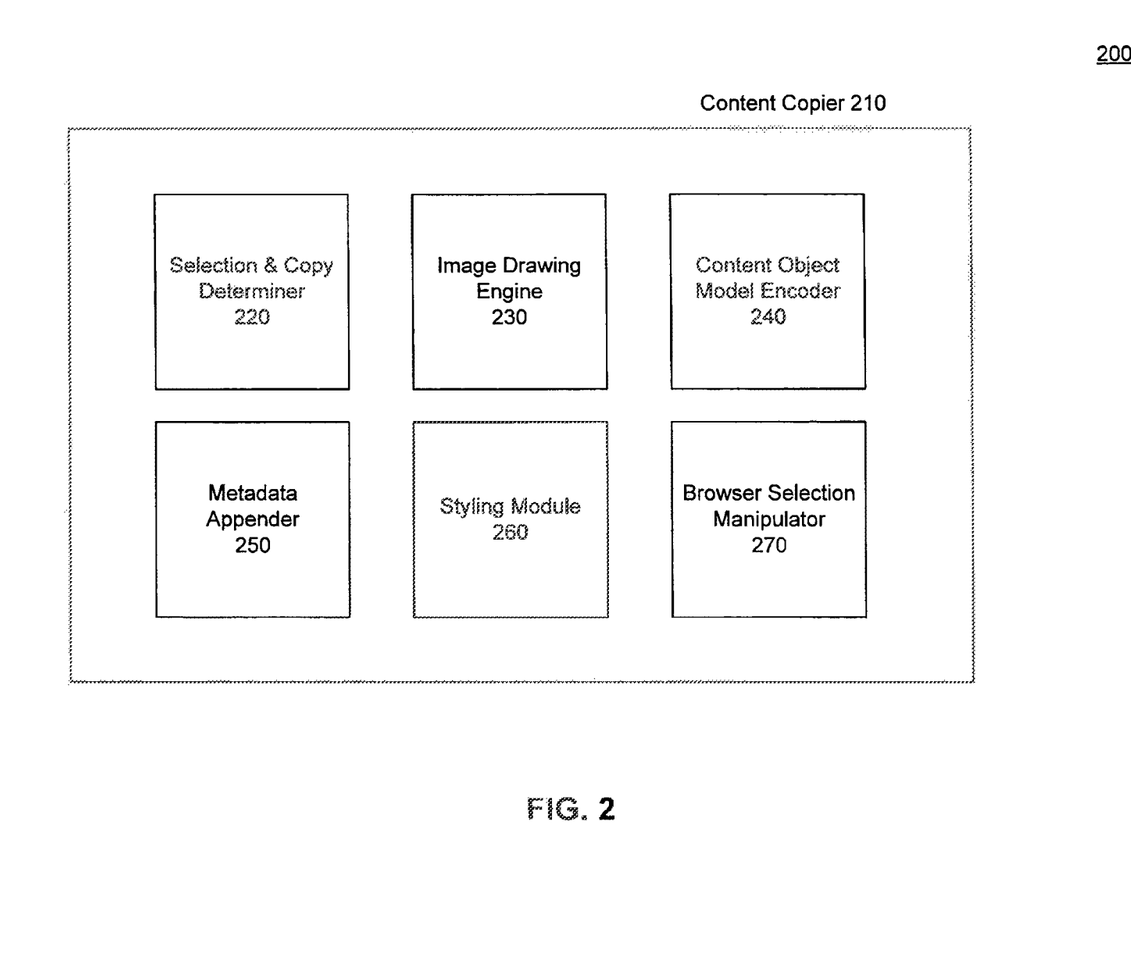
FIG. 2 is a diagram of a content copier, according to an embodiment.

FIG. 2 illustrates content copier 210, according to an embodiment. Content copier 210 enables embodiments to copy and paste/embed web content selections. In one embodiment, content copier 210 can be implemented in server 110 (e.g., as a server side component). In another embodiment, content copier 210 can be implemented in browser 130. In yet another embodiment, content copier 210 can be implemented in both server 110 and browser 130. As shown in FIG. 2, content copier 210 includes selection and copy determiner 220, image drawing engine 230, content object model encoder 240, metadata appender 250, styling module 260 and browser selection manipulator 270.

In an embodiment, selection and copy determiner 220 detects an intent to copy a selected region in a web content area. In an embodiment, selection and copy determiner 220 intercepts a "beforecopy" event (or any other intent to copy content) that is triggered by browser 130 when a user selects one or more regions in a web content area using, for example, an input device such as a mouse. As noted above, web content areas include, but are not limited to, content areas rendered as images using HTML5 and script-based interactive content areas (or any other content areas).

In another example, selection and copy determiner 220 may detect an intent to copy when the user provides a copy command (e.g., copy menu selection or "Ctrl-C") intending to copy content to a system clipboard. As known to those skilled in the art, the system clipboard is a facility that can be used for short-term data storage and/or data transfer between documents or applications, via copy and paste operations. It is most commonly a part of a graphical user interface (GUI) environment and is usually implemented as an anonymous, temporary block of memory that can be accessed from most or all programs within an environment via defined programming interfaces. A typical application accesses clipboard functionality by mapping user input (key bindings, menu selections, etc.) to these interfaces. Exemplary key bindings are: "Ctrl+c" to copy data onto the clipboard, "Ctrl+x" to cut data to the clipboard, and "Ctrl+v" to paste data from the clipboard. These examples are purely illustrative and are not intended to limit the embodiments.

In an embodiment, image drawing engine 230 draws an image representing a selected (or cropped) region identified by selection and copy determiner 220, into an image canvas. The image canvas can be based on dimensions (e.g., width and height) of the selected region. As a non-limiting example, the image canvas can be addressed using an HTML5 "<canvas>" element or tag. As known to those skilled in the art, the canvas element allows for dynamic and scriptable rendering of shapes and images.

In an embodiment, the image canvas includes a drawable region defined in HTML code (or any other language) with height and width attributes. Script code may access the image canvas through one or more drawing functions, thus allowing for dynamically generated graphics.

In an embodiment, metadata appender 250 extracts and appends metadata associated with the selected region of the web content area to the image drawn by image drawing engine 230. As a non-limiting example, where the web content area is an image of a book page, the metadata can include a content citation that provides a name of an author. In another non-limiting example, where the web content area is an image of an art work, the metadata can include a content citation that provides a name of an artist/photographer. These examples are purely illustrative and are not intended to limit the embodiments.

As noted above, the image drawn by image drawing engine 230 can be stored in a data structure (e.g., DOM container of the web content area) referenced by a browser image element. As known to those skilled in the art, the document object model (DOM) is a platform and language-neutral interface that allow programs and scripts to dynamically access and update the content, structure and style of documents.

In an embodiment, content object model encoder 240 interacts with selection and copy determiner 220, image drawing engine 230 and metadata appender 250 to copy web content area selections. In an embodiment, content object model encoder 240 operates on the DOM (or any other document structure) of the web content area. In an embodiment, content object model encoder 240 creates a DOM container to store the image drawn by image drawing engine 230, where the image can be referenced by a browser image element. In an embodiment, content object model encoder 240 manipulates the web content area and incorporates results of the manipulation into the presented web content area (e.g., interactive web page) so that the web content area can be dynamically updated as it is being displayed.

In a non-limiting embodiment, content object model encoder 240 inserts a parent node representing the container into the DOM of the web content area. In an embodiment, content object model encoder 240 can then append a first child node to the parent node, where the first child node references the image representing the selected region and also appends a second child node to the parent node, where the second child node references metadata (e.g., content citation) associated with the selected region.

Once updated by content object model encoder 240, the DOM container includes both the image representing the selected region of the web content area and the metadata associated with the selected region. Because the image representing the selected region is incorporated into the DOM of the web content area, this incorporation may, for example, cause the image to be displayed over the web content area as an unpleasant artifact. To resolve this, in an embodiment, styling module 260 applies a style sheet to the container to render the image representing the selected region together with a content citation outside a displayed region of the web content area. In this way, the image representing the selected region is remains incorporated into the DOM of the web content area, but does not appear as an unpleasant artifact displayed to a user.

In an embodiment, browser selection manipulator 270 changes a browser selection range to point to the data structure storing the image representing the selected region. The browser selection range (or browser range) is known to those skilled in the art as an in-browser memory area that stores any web page text (excluding images) that is presently selected by a user. Conventionally, browsers copy contents of the browser selection range into a system clipboard. Because the browser selection range is a text-only memory area that is unable to store images, embodiments enable the browser selection range to point to the image representing the selected region of the web content area using browser selection manipulator 270 so that the image is copied to the system clipboard by browser 130.

In order to copy the image representing the selected region to a system clipboard, browser selection manipulator 270 clears any previously stored contents of a browser selection range and changes the browser selection range to point to the data structure storing the image representing the selected region, before the browser copies the contents of the browser selection range into a system clipboard to perform a copy operation. In this way, the image (or metadata appended image) is copied to the system clipboard when the browser performs a copy operation because the browser copies contents of the changed browser selection range into the system clipboard. Once the image is stored in the system clipboard, the image can be embedded (or pasted) into other content areas distinct from the web content area. In this way, users are able to conveniently copy and paste web content selections. Furthermore, because a content citation can be automatically appended to the image before browser 130 performs a copy operation, any subsequent paste operation pastes (or embeds) the image together with its content citation (e.g., author/artist name).

Figure 3:
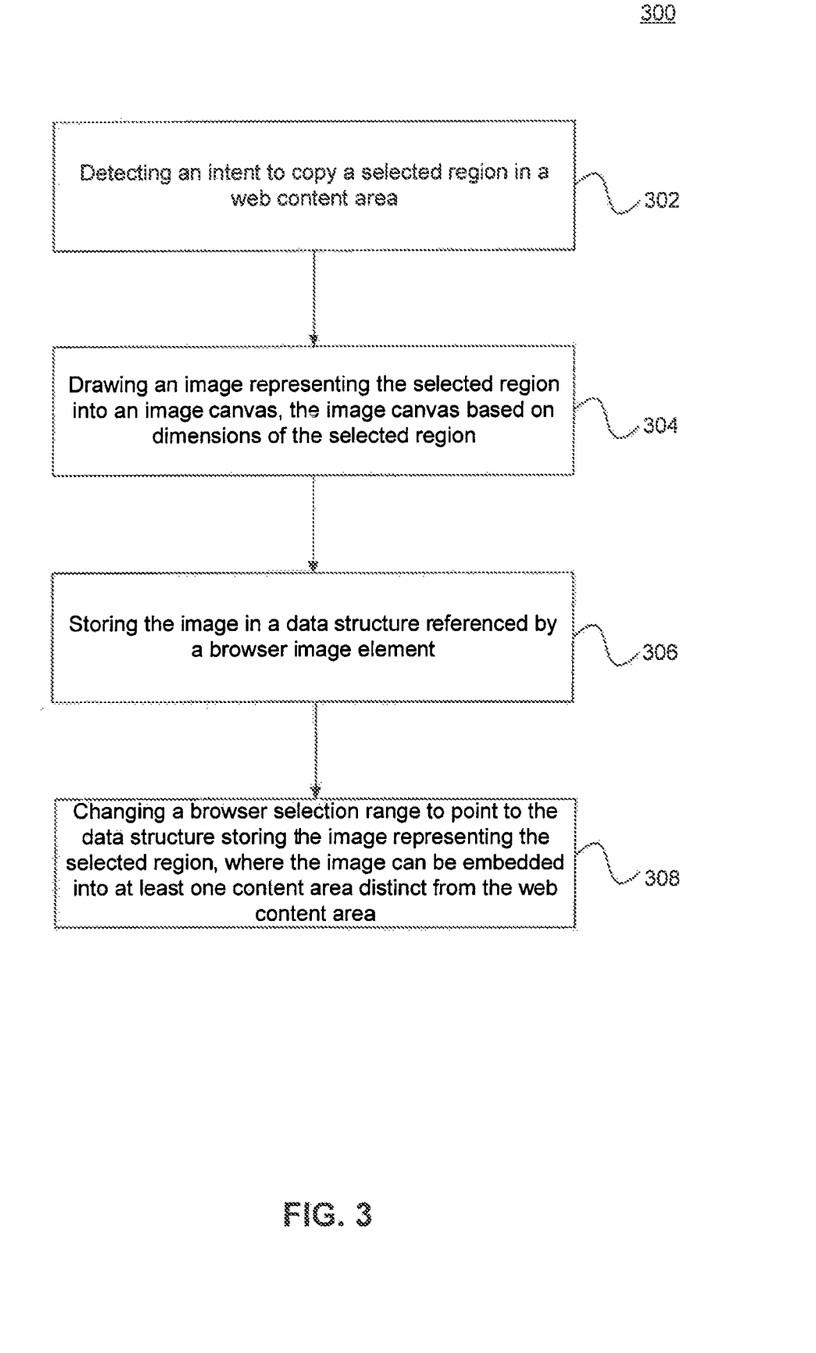
FIG. 3 is a flowchart illustrating an exemplary overall operation, according to an embodiment.

FIG. 3 illustrates method 300, which is an exemplary overall operation of a content copier, according to an embodiment.

In an embodiment, an intent to copy a selected region in a web content area is detected (step 302). As an example, the intent to copy (e.g., a "beforecopy" event) may be detected (or intercepted) when a user selects region(s) in a web content area and provides (or is about to provide) a copy command. When the intent is detected, embodiments draw an image representing the selected region into an image canvas (step 304). The image canvas can be based on dimensions of the selected region. The drawn image can be stored in a data structure (e.g., a document object model (DOM) container of the web content area) referenced by a browser image element (step 306). Embodiments may also extract metadata (e.g., content citation) associated with the selected region and append the metadata to the image.

In order to copy the image representing the selected region to a system clipboard, embodiments changes the browser selection range to point to the data structure storing the image representing the selected region (step 308), before the browser copies the contents of the browser selection range into a system clipboard to perform a copy operation responsive to the user's intent to copy the selected region. In this way, the image (or metadata appended image) is copied to the system clipboard when the browser performs a copy operation because the browser copies contents of the changed browser selection range to the system clipboard. Once the image is stored in the system clipboard, the image can be embedded (or pasted) into other content areas distinct from the web content area. It is to be appreciated that stages 302-308 may be performed in any order after the "beforecopy" event has been intercepted and before browser 130 copies contents of the browser selection range to the system clipboard.

Figure 4:
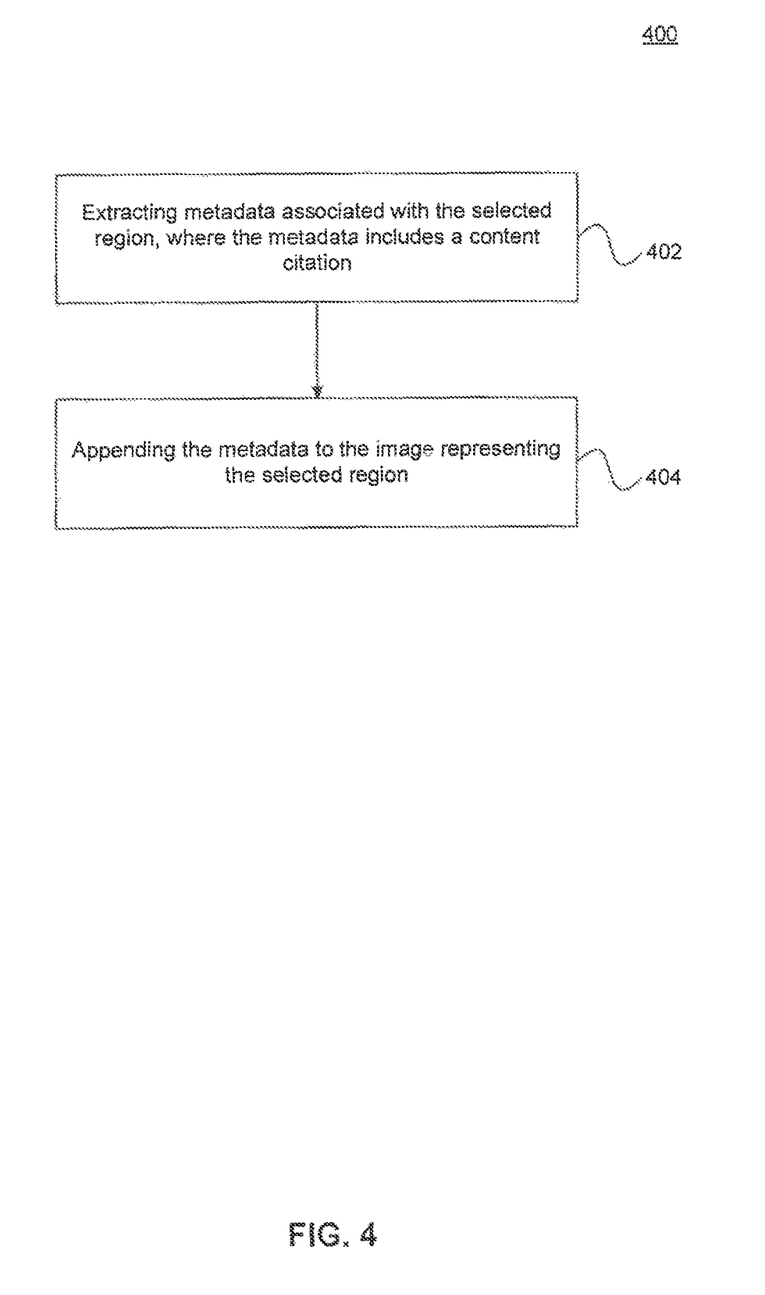
FIG. 4 is a flowchart illustrating an exemplary metadata appending operation, according to an embodiment.

FIG. 4 illustrates method 400, which is an exemplary metadata appending operation, according to an embodiment.

In this embodiment metadata associated with the selected region of the web content area is extracted and appended to the image representing the selected region (step 402). As a non-limiting example, where the web content area is an image of a book page, the metadata can include a content citation that provides a name of an author. In another non-limiting example, where the web content area is an image of an art work, the metadata can include a content citation that provides a name of an artist/photographer. These examples are purely illustrative and are not intended to limit the embodiments.

The extracted metadata is appended to the image representing the selected region of the web content area (step 404). As an example, metadata appender 250 may extract and append metadata to the image. As noted above, because a content citation can be automatically appended to the image before browser 130 performs a copy operation, any subsequent paste operation pastes (or embeds) the image together with its content citation (e.g., author/artist name).

Figure 5:
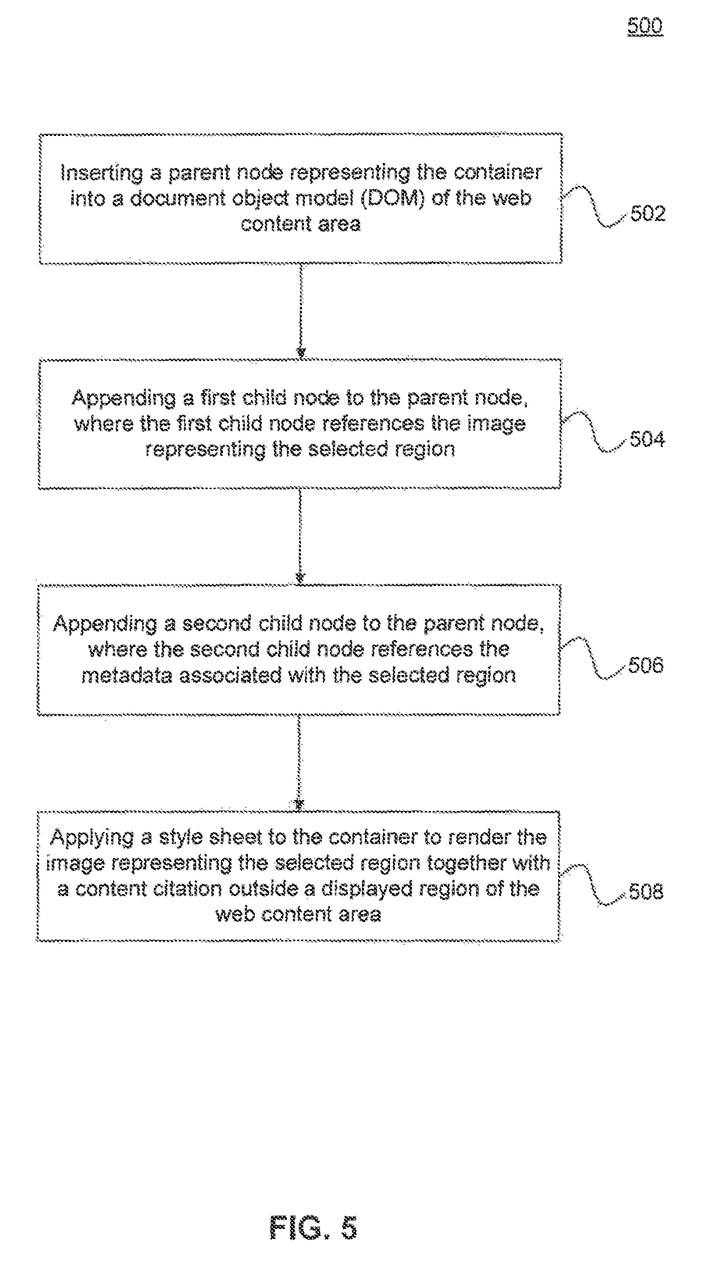
FIG. 5 is a flowchart illustrating exemplary operations on a document object model, according to an embodiment.

FIG. 5 illustrates method 500, illustrating exemplary DOM operations, according to an embodiment.

Method 500 begins with inserting a parent node representing a container into the document object model (DOM) of the web content area (step 502). In a non-limiting embodiment, content object model encoder 240 inserts a parent node representing the container into the DOM of the web content area.

In this embodiment a first child node is appended to the parent node, where the first child node references the image representing the selected region (step 504), and append a second child node to the parent node, where the second child node references metadata (e.g., content citation) associated with the selected region (step 506). In an embodiment, content object model encoder 240 can then append the first child node and the second child node to the parent node.

Once updated by content object model encoder 240, the DOM container includes both the image representing the selected region of the web content area and the metadata associated with the selected region. Because the image representing the selected region is incorporated into the DOM of the web content area, this incorporation may, for example, cause the image to be displayed over the web content area as an unpleasant artifact. To resolve this, embodiments apply a style sheet to the container to render the image representing the selected region together with a content citation outside a displayed region of the web content area (step 508). As an example, styling module 260 applies a style sheet to the container to render the image representing the selected region together with a content citation outside a displayed region of the web content area. In this way, the image representing the selected region is remains incorporated into the DOM of the web content area, but does not appear as an unpleasant artifact displayed to a user.

Figure 6:
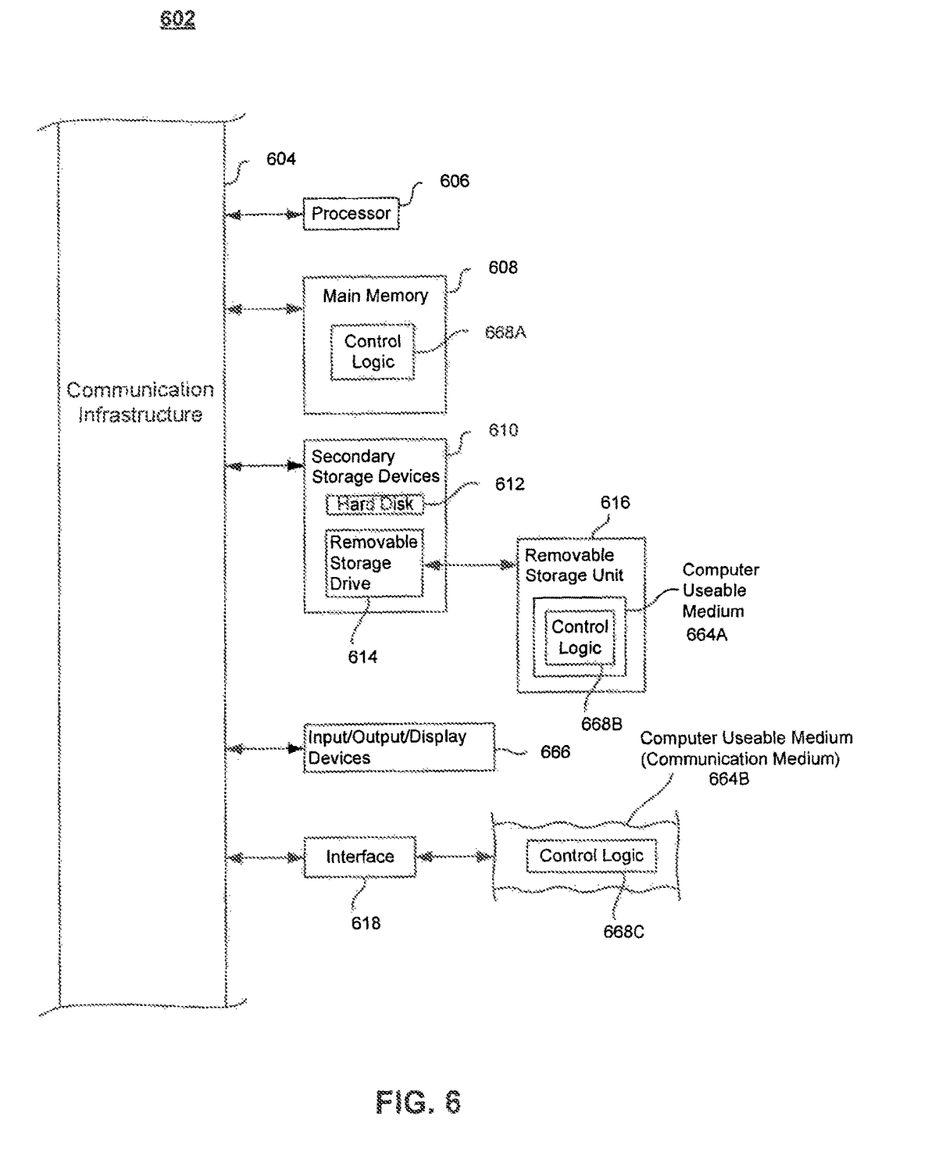
FIG. 6 illustrates an example computer useful for implementing components of the embodiments.

In an embodiment, the system, methods and components of embodiments described herein are implemented using one or more computers, such as example computer 602 shown in FIG. 6. For example, client 120, server 110 and browser 130 can be implemented using computer(s) 602.

Computer 602 can be any commercially available and well known computer capable of performing the functions described herein, such as computers available from International Business Machines, Apple, Oracle, HP, Dell, Cray, etc.

Computer 602 includes one or more processors (also called central processing units, or CPUs), such as a processor 606. Processor 606 is connected to a communication infrastructure 604.

Computer 602 also includes a main or primary memory 608, such as random access memory (RAM). Primary memory 608 has stored therein control logic 668A (computer software), and data.

Computer 602 also includes one or more secondary storage devices 610. Secondary storage devices 610 include, for example, a hard disk drive 612 and/or a removable storage device or drive 614, as well as other types of storage devices, such as memory cards and memory sticks. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 664A having stored therein computer software 668B (control logic) and/or data. Removable storage unit 616 represents a floppy disk, magnetic tape, compact disk, DVD, optical storage disk, or any other computer data storage device. Removable storage drive 614 reads from and/or writes to removable storage unit 616 in a well-known manner.

Computer 602 also includes input/output/display devices 666, such as monitors, keyboards, pointing devices, Bluetooth devices, etc.

Computer 602 further includes a communication or network interface 618. Network interface 618 enables computer 602 to communicate with remote devices. For example, network interface 618 allows computer 602 to communicate over communication networks or mediums 664B (representing a form of a computer useable or readable medium), such as LANs, WANs, the Internet, etc. Network interface 618 may interface with remote sites or networks via wired or wireless connections.

Control logic 668C may be transmitted to and from computer 602 via communication medium 664B.

Any tangible apparatus or article of manufacture comprising a computer useable or readable medium having control logic (software) stored therein is referred to herein as a computer program product or program storage device. This includes, but is not limited to, computer 602, main memory 608, secondary storage devices 610 and removable storage unit 616. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

The Summary and Abstract sections may set forth one or more but not all exemplary embodiments as contemplated by the inventor(s), and thus, are not intended to limit the present embodiments and the appended claims in any way.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described exemplary embodiments, but should be defined only in accordance with the following claims and their equivalents.

What is claimed is:

1. A computer implemented method, comprising:
   detecting an intent to copy a selected region of a web content area displayed in a web browser, wherein the displayed web content area corresponds to a document object model (DOM);
   drawing an image representing the selected region into an image canvas, the image canvas corresponding to dimensions of the selected region;
   storing the image in the DOM of the displayed web content area while the web content area is displayed in the web browser, wherein the storing comprises applying a style sheet to render the stored image outside of a displayed portion of the web content area in the web browser so that the storing of the image does not change the displayed web content area; and changing a browser selection range to point to the DOM storing the image representing the selected region, wherein the image is embedded into at least one content area distinct from the web content area, and wherein the detecting, the drawing, and the changing are performed using one or more processors.

2. The method of claim 1, wherein the storing further comprises:

extracting metadata associated with the selected region; and storing the extracted metadata in the DOM of the displayed web content area.

3. The method of claim 2, further comprising:

appending the metadata to the image prior to the changing.

4. The method of claim 1, wherein the drawing comprises:

instantiating the image canvas using a width and a height of the selected region.

5. The method of claim 1, wherein the web content area is part of a displayed web page, and wherein the storing further comprises modifying the DOM of the displayed web page without changing the web content area displayed in the web browser.

6. A processor-based system, comprising:

one or more processors; a tangible memory comprising code that when executed by the one or more processors cause the one or more processors to:

detect an intent to copy a selected region of a web content area displayed in a web browser, wherein the displayed web content area corresponds to a document object model (DOM);

draw an image representing the selected region into an image canvas, the image canvas corresponding to dimensions of the selected region;

store the image in the DOM of the displayed web content area while the web content area is displayed in the web browser, wherein the storing comprises applying a style sheet to render the stored image outside of a displayed portion of the web content area in the web browser so that the storing of the image does not change the displayed web content area; and change a browser selection range to point to the DOM storing the image representing the selected region, wherein the image is embedded into at least one content area distinct from the web content area.

7. The system of claim 6, wherein the code that cause the one or more processors to store further comprise code that causes the one or more processors to:

extract metadata associated with the selected region; and store the extracted metadata in the DOM of the displayed web content area.

8. The system of claim 7, further comprising code that causes the one or more processors to:

append the metadata to the image prior, to the changing.

9. The system of claim 6, wherein the code that cause the one or more processors to draw comprises code that causes the one or more processors to:

instantiate the image canvas using a width and a height of the selected region.

10. The system of claim 6, wherein the web content area is part of a displayed web page, and wherein the storing further comprises modifying the DOM of the displayed web page without changing the web content area displayed in the web browser.

11. A computer storage apparatus encoded with a computer program, the program comprising instructions that when executed by a data processing apparatus cause the data processing apparatus to perform operations comprising:

detecting an intent to copy a selected region of a web content area displayed in a web browser, wherein the displayed web content area corresponds to a document object model (DOM);

drawing an image representing the selected region into an image canvas, the image canvas corresponding to dimensions of the selected region;

storing the image in the DOM of the displayed web content area while the web content area is displayed in the web browser, wherein the storing comprises applying a style sheet to render the stored image outside of a displayed portion of the web content area in the web browser so that the storing of the image does not change the displayed web content area; and changing a browser selection range to point to the DOM storing the image representing the selected region, wherein the image is embedded into at least one content area distinct from the web content area, and wherein the detecting, the drawing, the storing and the changing are performed using one or more processors.

12. The computer storage apparatus of claim 11, wherein the storing further comprises:

extracting metadata associated with, the selected region; and storing the extracted metadata in the DOM of the displayed web content area.

13. The computer storage apparatus of claim 12, further comprising:

appending the metadata to the image prior to the changing.

14. The computer storage apparatus of claim 11, wherein the drawing comprises:

instantiating the image canvas using a width and a height of the selected region.

15. The computer storage apparatus of claim 11, wherein the web content area is part of a displayed web page, and wherein the storing further comprises modifying the DOM of the displayed web page without changing the web content area displayed in the web browser.

* * * * *